US011466380B2

(12) United States Patent
Bullington et al.

(10) Patent No.: US 11,466,380 B2
(45) Date of Patent: *Oct. 11, 2022

(54) COMPOSITE GRAPHENE STRUCTURES

(71) Applicant: Garmor Inc., Orlando, FL (US)

(72) Inventors: Jeff Bullington, Orlando, FL (US); Richard A. Stoltz, Plano, TX (US)

(73) Assignee: Asbury Graphite of North Carolina, Inc., Lumberton, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,767

(22) Filed: Apr. 27, 2020

(65) Prior Publication Data
US 2020/0255967 A1 Aug. 13, 2020

Related U.S. Application Data

(63) Continuation of application No. 15/914,173, filed on Mar. 7, 2018, now Pat. No. 10,815,583, which is a continuation of application No. 14/353,760, filed as application No. PCT/US2012/061457 on Oct. 23, 2012, now Pat. No. 9,951,436.

(60) Provisional application No. 61/551,983, filed on Oct. 27, 2011.

(51) Int. Cl.
C25D 13/02 (2006.01)
C25D 15/00 (2006.01)
C25D 13/04 (2006.01)
C09D 155/02 (2006.01)
C08L 63/00 (2006.01)
B82Y 30/00 (2011.01)
C09D 7/20 (2018.01)
D06M 11/83 (2006.01)
D06M 11/73 (2006.01)
D01F 11/16 (2006.01)
D01F 11/12 (2006.01)
C23C 18/16 (2006.01)
C23C 18/36 (2006.01)
C09D 163/00 (2006.01)

(52) U.S. Cl.
CPC .............. *C25D 15/00* (2013.01); *B82Y 30/00* (2013.01); *C08L 63/00* (2013.01); *C09D 7/20* (2018.01); *C09D 155/02* (2013.01); *C09D 163/00* (2013.01); *C23C 18/1641* (2013.01); *C23C 18/36* (2013.01); *C25D 13/02* (2013.01); *C25D 13/04* (2013.01); *D01F 11/12* (2013.01); *D01F 11/16* (2013.01); *D06M 11/73* (2013.01); *D06M 11/83* (2013.01); *Y10T 428/292* (2015.01); *Y10T 428/2944* (2015.01)

(58) Field of Classification Search
CPC .................................................... C25D 13/02
See application file for complete search history.

(56) References Cited

U.S. PATENT DOCUMENTS

| 2,459,520 | A | 1/1949 | Greenshields |
|---|---|---|---|
| 4,046,863 | A | 9/1977 | Kobayashi et al. |
| 5,057,370 | A | 10/1991 | Krieg et al. |
| 5,360,582 | A | 11/1994 | Boyd et al. |
| 5,501,934 | A | 3/1996 | Sukata et al. |
| 5,506,061 | A | 4/1996 | Kindl et al. |
| 5,509,993 | A | 4/1996 | Hirschvogel |
| 5,583,176 | A | 12/1996 | Haberle |
| 6,004,712 | A | 12/1999 | Barbetta et al. |
| 6,172,163 | B1 | 1/2001 | Rein et al. |
| 6,348,279 | B1 | 2/2002 | Saito et al. |
| 6,436,567 | B1 | 8/2002 | Saito et al. |
| 7,005,205 | B1 | 2/2006 | Gyoten et al. |
| 7,231,084 | B2 | 6/2007 | Tang et al. |
| 7,329,698 | B2 | 2/2008 | Noguchi et al. |
| 7,623,340 | B1 | 11/2009 | Song et al. |
| 8,168,964 | B2 | 5/2012 | Hiura et al. |
| 8,216,541 | B2 | 7/2012 | Jang et al. |
| 8,580,132 | B2 | 11/2013 | Lin et al. |
| 9,758,379 | B2 | 9/2017 | Blair |
| 9,802,206 | B2 | 10/2017 | Kitaura et al. |
| 10,138,969 | B2 | 11/2018 | Hattori et al. |
| 10,287,167 | B2 | 5/2019 | Blair |
| 2002/0008031 | A1 | 1/2002 | Barsukov et al. |
| 2002/0119358 | A1 | 8/2002 | Rock |
| 2002/0182387 | A1 | 12/2002 | Mercuri et al. |
| 2004/0000735 | A1 | 1/2004 | Gilbert, Sr. et al. |
| 2004/0033189 | A1 | 2/2004 | Kaschak et al. |
| 2004/0071896 | A1 | 4/2004 | Kang |
| 2004/0209150 | A1 | 10/2004 | Rock |
| 2005/0041373 | A1 | 2/2005 | Pruss |
| 2005/0191471 | A1 | 9/2005 | Haggquist |
| 2005/0196636 | A1 | 9/2005 | Kawakami et al. |
| 2005/0208319 | A1 | 9/2005 | Finley et al. |
| 2006/0241236 | A1* | 10/2006 | Kuznetsov ........... C09D 133/12 977/734 |

(Continued)

FOREIGN PATENT DOCUMENTS

| CN | 101462889 A | 6/2009 |
|---|---|---|
| CN | 102021633 A | 4/2011 |

(Continued)

OTHER PUBLICATIONS

Extended European Search Report for EP 15834377.2 dated Mar. 9, 2018, 8 pp.

(Continued)

*Primary Examiner* — Brian W Cohen
(74) *Attorney, Agent, or Firm* — Edwin S. Flores; Chalker Flores, LLP

(57) ABSTRACT

Graphene has been used in nanocomposites as constituents/doping in plastics or epoxy providing dramatic enhancement of the mechanical properties but have not progressed past the laboratory level novelty. This invention can provide a graphene based composite structure with a density less that 1.9 g/cm$^3$ for a fiber, yarn, rope or cable and a density less that 1.5 g/cm$^3$ for a sheet both structure have tensile and shear strength greater than either Aluminum or Steel; thus providing a graphene material that is both much lighter and stronger.

17 Claims, No Drawings

(56) References Cited

U.S. PATENT DOCUMENTS

| | | |
|---|---|---|
| 2007/0219336 A1 | 9/2007 | Ito |
| 2007/0284557 A1 | 12/2007 | Gruner et al. |
| 2008/0048152 A1 | 2/2008 | Jang et al. |
| 2008/0206124 A1 | 8/2008 | Jang et al. |
| 2008/0279710 A1 | 11/2008 | Zhamu et al. |
| 2008/0318110 A1 | 12/2008 | Budinski et al. |
| 2009/0017211 A1 | 1/2009 | Cruner et al. |
| 2009/0092747 A1 | 4/2009 | Zhamu et al. |
| 2009/0140801 A1 | 6/2009 | Ozyilmaz et al. |
| 2009/0215953 A1 | 8/2009 | Hwang et al. |
| 2009/0224420 A1 | 9/2009 | Wilkinson |
| 2009/0241496 A1 | 10/2009 | Pintault et al. |
| 2010/0006445 A1 | 1/2010 | Tomatschger |
| 2010/0028681 A1 | 2/2010 | Dai et al. |
| 2010/0055025 A1 | 3/2010 | Jang et al. |
| 2010/0055458 A1 | 3/2010 | Jang et al. |
| 2010/0056819 A1 | 3/2010 | Jang et al. |
| 2010/0092809 A1 | 4/2010 | Drzal et al. |
| 2010/0143732 A1 | 6/2010 | Swift et al. |
| 2010/0147188 A1 | 6/2010 | Mamak et al. |
| 2010/0151318 A1 | 6/2010 | Lopatin et al. |
| 2010/0209731 A1 | 8/2010 | Humano |
| 2010/0239870 A1 | 9/2010 | Bowen |
| 2010/0296253 A1 | 11/2010 | Miyamoto et al. |
| 2010/0317790 A1 | 12/2010 | Jang et al. |
| 2011/0017585 A1 | 1/2011 | Zhamo et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0120347 A1 | 5/2011 | Chung et al. |
| 2011/0143018 A1 | 6/2011 | Peng et al. |
| 2011/0159372 A1 | 6/2011 | Zhamu et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025131 A1 | 2/2012 | Forero |
| 2012/0025420 A1 | 2/2012 | Utashiro et al. |
| 2012/0055612 A1 | 3/2012 | Ahmed et al. |
| 2012/0065309 A1 | 3/2012 | Agrawal et al. |
| 2012/0077017 A1 | 3/2012 | Buresch |
| 2012/0107562 A1 | 3/2012 | Bolotin et al. |
| 2012/0129736 A1 | 5/2012 | Tour et al. |
| 2012/0184065 A1 | 7/2012 | Gharib et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0236715 A1 | 9/2013 | Zhamu et al. |
| 2013/0240033 A1 | 9/2013 | Jeon et al. |
| 2013/0264041 A1 | 10/2013 | Zhamu et al. |
| 2013/0272950 A1 | 10/2013 | Yun et al. |
| 2013/0330833 A1 | 12/2013 | Ruiz et al. |
| 2014/0018480 A1 | 1/2014 | Lee et al. |
| 2014/0030590 A1 | 1/2014 | Wang et al. |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0204384 A1 | 7/2014 | Lee et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0284253 A1 | 10/2015 | Zhamu et al. |
| 2015/0368436 A1 | 12/2015 | Chiu et al. |
| 2016/0016803 A1 | 1/2016 | Stoltz et al. |
| 2016/0083552 A1 | 3/2016 | Nosker et al. |
| 2016/0144339 A1 | 5/2016 | Kim et al. |
| 2016/0216629 A1 | 7/2016 | Grinwald |
| 2017/0166722 A1 | 6/2017 | Zhamu et al. |
| 2017/0233290 A1 | 8/2017 | Christiansen et al. |
| 2019/0051903 A1 | 2/2019 | Manabe et al. |

FOREIGN PATENT DOCUMENTS

| | | |
|---|---|---|
| CN | 102586952 A | 7/2012 |
| CN | 102719719 A | 7/2012 |
| CN | 103058541 A | 4/2013 |
| CN | 103130436 A | 6/2013 |
| CN | 103215693 A | 7/2013 |
| CN | 103408880 A | 11/2013 |
| CN | 103545536 A | 1/2014 |
| CN | 10356997 A | 2/2014 |
| CN | 103757823 A | 4/2014 |
| CN | 103819915 A | 5/2014 |
| CN | 103962102 A | 8/2014 |
| CN | 104319372 A | 1/2015 |
| CN | 104446176 A | 3/2015 |
| CN | 104844930 A | 4/2015 |
| CN | 106700356 A | 5/2017 |
| CN | 108276576 A | 7/2018 |
| EP | 0949704 A1 | 10/1999 |
| EP | 1227531 A1 | 7/2002 |
| EP | 2560228 A1 | 2/2013 |
| GB | 723598 A | 2/1955 |
| JP | S6169853 A | 4/1986 |
| JP | 64009808 A | 1/1989 |
| JP | 2012007224 A | 1/2012 |
| JP | 2012136567 A | 7/2012 |
| KR | 20110119429 A | 11/2011 |
| KR | 20130048741 A | 4/2013 |
| KR | 20130090979 A | 8/2013 |
| KR | 1020150026092 | 3/2015 |
| KR | 1020170019802 | 2/2017 |
| RU | 2456361 C1 | 7/2012 |
| WO | 2009032069 A1 | 3/2009 |
| WO | 2009059193 A1 | 5/2009 |
| WO | 2010089326 A1 | 8/2010 |
| WO | 2010091352 A2 | 8/2010 |
| WO | 2011014242 A1 | 2/2011 |
| WO | 2011074125 | 6/2011 |
| WO | 2011078639 A2 | 6/2011 |
| WO | 2011086391 A1 | 7/2011 |
| WO | 2011087301 A2 | 7/2011 |
| WO | 2011099761 A2 | 8/2011 |
| WO | 2011162727 A1 | 12/2011 |
| WO | 2012058553 A2 | 5/2012 |
| WO | 2012148880 A2 | 11/2012 |
| WO | 2012177864 A1 | 12/2012 |
| WO | 2013001266 A1 | 1/2013 |
| WO | 2013096990 A1 | 7/2013 |
| WO | 2014062226 A1 | 4/2014 |
| WO | 2014080144 A1 | 5/2014 |
| WO | 2014104446 A1 | 7/2014 |
| WO | 2014138587 A1 | 9/2014 |
| WO | 2014210584 A1 | 12/2014 |
| WO | 2016154057 A1 | 9/2016 |

OTHER PUBLICATIONS

Extended European Search Report for EP 16780450.9 dated Jul. 13, 2018, 18 pp.

Wu, Q., et al., "Supercapacitors Based on Flexible Graphene/Polyaniline Nanofiber Composite Films," ACS Nano (2010), 4(4):1963-1970.

Extended European Search Report for EP 16849382.3 dated Apr. 30, 2019, 10 pp.

Extended European Search Report for EP 17865997.5 dated Jul. 22, 2019, 7 pp.

International Search Report and Written Opinion for PCT/US2019/051405 from KIPO dated Jan. 3, 2020.

Kaur, S., et al., "Enhanced thermal transport at covalently functionalized carbon nanotube array interfaces," Nature Communications, Jan. 22, 2014, pp. 1-8.

Kirschner, M., "Ozone," Ullmann's Enclyclopedia of Industrial Chemistry, vol. 25, 2012, pp. 637-644.

(56) References Cited

OTHER PUBLICATIONS

Maguire, J. A., et al., "Efficient low-temperature thermal functionalization of alkanes. Transfer dehydrogenation catalyzed by Rh(PMe3)2Cl(CO) in solution under a high-pressure hydrogen atmosphere," J. Am. Chem. Soc., Aug. 1, 1991, vol. 113:17, pp. 6706-6708.
Minus, M., et al., "The Processing, Properties, and Structure of Carbon Fibers," JOM, Feb. 2005, pp. 52-58.
Pauling, L., General Chemistry, Chapter 15, "Oxidation-Reduction Reactions Electrolysis," Dover Publications, Inc., 1970, 41 pp.
Polymers: A Properties Database, "Poly(ethylene terphthalate)", Chemnetbase, downloaded from http://poly.chemnetbase.com, Jan. 24, 2016, 5 pp.
Babak, F., et al., "Preparation and Mechanical Properties of Graphene Oxide: Cement Nanocomposites," The Scientific World Journal, vol. 2014, ID 276323, 10 pp.
Rahman, M.A., et al., "The effect of residence time on the physical characterists of PAN-based fibers produced using a solvent-free coagulation process," Materials Science and Engineering A 448, 2007, pp. 275-280.
Wang, Q., et al., "Nanostructures and Surface Nanomechanical Properties of Polyacrylonitrile/Graphene Oxide Composite Nanofibers by Electrospinning," J. Appl. Polym. Sci., 2013.
Xia, et al., "Effects of resin content and preparing conditions on the properties of polyphenylene sulfide resin/graphite composite for bipolar plate," Journal of Power Sources, vol. 178, Dec. 5, 2007, pp. 363-367.
Chemical Book, <<https://www.chemicalbook.com/ChemicalProductProperty_EN_CB8295389.htm>>, year 2017.
Chemical Book, <<https://www.chemicalbook.com/ProductChemical PropertiesCB8123794_EN.htm>>, year 2017.
Gong, et al., "Optimization of the Reinforcement of Polymer-Based Nanocomposites with Graphene," ECCM 15-15th European Conference on Composite Materials, Venice, Italy, Jun. 24-28, 2012.
Gulotty, R., et al., "Effects of Functionalization on Thermal Properties of Single-Wall and Multi-Wall Carbon Nanotube—Polymer Nancomposites," UC Riverside—Polytechnic of Turin (2013), 25 pp.
Porter, Roger S. et al., "Property Opportunities with Polyolefins, A Review Preparations and Applications of High Stiffness and Strength by Uniaxial Draw," Polymer, 35:23, 1994, pp. 4979-4984.
Song, M., et al., "The Effect of Surface Functionalization on the Immobilization of Gold Nanoparticles on Graphene Sheets," Journal of Nanotechnology, vol. 2012, Art. ID 329318, Mar. 28, 2012, 5 pp.
Academic Press Dictionary of Science and Technology ("Flake", p. 1, obtained online Aug. 19, 2016).
Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.
Ebinezar, et al., "Analysis of hardness test for aluminum carbon nanotube metal matrix and graphene," Indian Journal of Engineering, vol. 10, No. 21, 2014, pp. 33-39.
Extended European Search Report and Opinion for EPO 12844344.7 dated Oct. 22, 2015, 8 pp.
Extended European Search Report and Opinion for EPO 14759787.6 dated Oct. 6, 2016, 13 pp.
Extended European Search Report and Opinion for EPO 14760912.7 dated May 11, 2016, 8 pp.
Fang, M., et al., ""Covalent polymer functionalization of graphenenanosheets and mechanical properties of composites"" Journal of Materials Chemistry, 2009, vol. 19, No. 38, pp. 7098-7105.
Feng, H., et al., "A low-temperature method to produce highly reduced graphene oxide," Nature Communications, Feb. 26, 2013, 8 pp.
FMC, Persulfates Technical Information, (http://ww.peroxychem.com/media/90826/aod_brochure_persulfate.pdf, downloaded on Jan. 19, 2017) 16 pp.
Herman, A., et al., "Bipolar plates for PEM fuel cells: a review." International Journal of Hydrogen Energy, 2005, vol. 30, No. 12, pp. 1297-1302.
Hwang, T., et al., "One-step metal electroplating and patterning on a plastic substrate using an electrically-conductive layer of few-layer graphene," Carbon, Sep. 17, 2011, vol. 50, No. 2, pp. 612-621.
International Search Report and Written Opinion for PCT/US2012/061457 from KIPO dated Mar. 15, 2013, 10 pp.
International Search Report and Written Opinion for PCT/US2014/021765 from KIPO dated Jul. 24, 2014, 11 pp.
International Search Report and Written Opinion for PCT/US2014/021810 from KIPO dated Jul. 14, 2014, 10 pp.
International Search Report and Written Opinion for PCT/US2014/062371 from KIPO dated Feb. 11, 2015, 12 pp.
International Search Report and Written Opinion for PCT/US2015/045657 from KIPO dated Oct. 27, 2015, 6 pp.
International Search Report and Written Opinion for PCT/US2015/049398 from KIPO dated Dec. 16, 2015, 13 pp.
International Search Report and Written Opinion for PCT/US2016/014873 from KIPO dated May 13, 2016, 15 pp.
International Search Report and Written Opinion for PCT/US2016/022229 from KIPO dated Jun. 27, 2016, 15 pp.
International Search Report and Written Opinion for PCT/US2016/023273 from KIPO dated Jul. 12, 2016.
International Search Report and Written Opinion for PCT/US2016/023435 from KIPO dated May 30, 2016, 13 pp.
International Search Report and Written Opinion for PCT/US2016/025307 from KIPO dated Sep. 12, 2016, 11 pp.
International Search Report and Written Opinion for PCT/US2016/025338 from KIPO dated Jul. 25, 2016, 12 pp.
International Search Report and Written Opinion for PCT/US2016/052292 from KIPO dated Nov. 21, 2016, 14 pp.
International Search Report and Written Opinion for PCT/US2017/027231 from KIPO dated Jul. 11, 2017, 18 pp.
Jeon, I., et al., "Edge-carboxylated graphene nanosheets via ball milling." Proceedings of the National Academy of Sciences of the United States of AmericaPNAS, Apr. 10, 2012, vol. 109, No. 15, pp. 5588-5593.
Liu, Y. B., et al., "Recent development in the fabrication of metal matrix-particulate composites using powder metallurgy techniques," Journal of Materials Science, vol. 29, No. 8, 1994, pp. 1999-2007.
McQuarrie (2011, General Chemistry (4th Edition). University Science Books, Appendix G "Standard Reduction Voltages for Aqueous Solutions at 25C, p. A-34 to A-37 and also p. 949, Table 25.3. Online version available at:http://app.knovel.com/hotlink!toc/id:kpGCE00013/general-chemistry-4th/general-chemistry-4th)".
Merriam-Webster ("Definition of Flake" p. 1-9, obtained online Aug. 19, 2016).
Mohajerani, E., et al., "Morphological and thickness analysis for PMMA spin coated films," Journal of Optoelectronics and Advanced Materials, vol. 9:12, Dec. 2007, p. 3901-3906.
Moustafa, S.F., et al., "Copper matrix SiC and A1203 particulate composites by powder metallurgy technique," Materials Letters, 2002, vol. 53, No. 4, pp. 244-249.
Ong, T. S., et al., "Effect of atmosphere on the mechanical milling of natural graphite," Carbon, 2000, vol. 38, No. 15, pp. 2077-2285.
Rafiee, M. et al., "Fracture and fatigue in graphene nanocomposites." Small, 2010, vol. 6, No. 2, pp. 179-183.
Steurer, P., et al., ""Functionalized graphenes and thermoplasticnanocomposites based upon expanded graphite oxide."" Macromolecular Rapid Communications, 2009, vol. 30, Nos. 4-5, pp. 316-327.
Szabo, T., et al., "Evolution of Surface Functional Groups in a Series of Progressively Oxidized Graphite Oxides," Chem. Mater., vol. 18, Mar. 29, 2006, pp. 2740-2749.
Taeseon, H., et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.
USP Technologies, "What is the pH of H2O2 solutions?,"http://www.h2o2.com/faqs/FaqDetail.aspx?fld=26, accessed Jan. 19, 2017, 2 pp.

(56) References Cited

OTHER PUBLICATIONS

Wang, X et al., ""In situ polymerization of graphene nanosheets andpolyurethane with enhanced mechanical and thermal properties."" Journal of materials Chemistry, 2011, vol. 21, No. 12, pp. 4222-4227.

Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.

Wu, Z-S. et al., "Field Emission of Single-Layer Films Prepared by Electrophoretic Deposition." Advanced Materials, 21, 2009, pp. 1756-1760.

Zhao, W., et al., "Preparation of graphene by exfoliation of graphite using wet ball milling." Journal of Materials Chemistry, Jun. 3, 2010, vol. 20, pp. 5817-5819.

Extended European Search Report and Opinion for EPO 17185605.7 dated Nov. 29, 2017, 7 pp.

International Search Report and Written Opinion for PCT/US2017/058512 from KIPO dated Feb. 7, 2018, 14 pp.

Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.

Extended European Search Report for EP 16765526.5 dated Feb. 13, 2018, 7 pp.

Extended European Search Report for EP 16769452.0 dated Mar. 1, 2018, 9 pp.

Extended European Search Report for EP 16780450.9 dated Apr. 19, 2018, 17 pp.

Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.

Li, Y., et al., "Hybridizing wood cellulose and graphene oxide toward high-performance fibers," NPG Asia Materials, 7, Jan. 9, 2015, 14 pp.

Tissera, N., et al., "Hydrophobic cotton textile surfaces using an amphiphilic graphene oxide (GO) coating," Applied Surface Science, 324, Nov. 4, 2014 (2015), pp. 455-463.

CN 102586952 Google translation 7 pp.

CN 103545536 Google translation 5 pp.

Extended European Search Report for EP 19862892.7 dated Oct. 12, 2021, 11 pp.

Osicka, et al., "Light-Induced and Sensing Capabilities of SI-ATRP Modified Graphene Oxide particles in Elastomeric Matrix," Active and Passive Smart Structures and Integrated Systems 2017, vol. 10164, 1016434, doi: 10.1117/12.2260703, 10.pp.

Wang, Y., et al., "Kevlar oligomer functionalized graphene for polymer composites," Polymer, 52, Ju. 15, 2011, 3661-3670.

Zheng, H., et al., "Graphene oxide-poly (urea-formaldehyde) composites for corrosion protection of mild steel," Corrosion Science, Apr. 27, 2018, 139, pp. 1-12.

\* cited by examiner

COMPOSITE GRAPHENE STRUCTURES

PRIORITY CLAIM AND CROSS-REFERENCE TO RELATED APPLICATIONS

This patent application is a continuation of U.S. patent application Ser. No. 15/914,173 filed on Mar. 7, 2018, which is a continuation of U.S. patent application Ser. No. 14/353,760 filed on Apr. 23, 2014 and now U.S. Pat. No. 9,951,436 issued on Apr. 24, 2018; which claims priority to the International Patent Application Serial No. PCT/US2012/061457, filed on Oct. 23, 2012, which claims the benefit of U.S. Provisional Application Ser. No. 61/551,983, filed Oct. 27, 2011, each of which is hereby incorporated by reference in its entirety.

TECHNICAL FIELD OF THE INVENTION

The present invention relates in general to the field of nanocomposites, and more particularly, to a graphene based composite structure.

BACKGROUND OF THE INVENTION

Without limiting the scope of the invention, its background is described in connection with composite materials.

Graphene is one of the strongest materials ever tested. Measurements have shown that graphene has a breaking strength 200 times greater than steel, with a tensile modulus (stiffness) of 1 TPa (150,000,000 psi). An atomic Force Microscope (AFM) has been used to measure the mechanical properties of a suspended graphene sheet. Graphene sheets, held together by van der Waals forces, were suspended over $SiO_2$ cavities where an AFM tip was probed to test its mechanical properties. Its spring constant was in the range 1-5 N/m and the Young's modulus was 0.5 TPa (500 GPa) thereby demonstrating that graphene can be mechanically very strong and rigid. Despite these nanoscale mechanical properties, Graphene has not been able to transition to a macro-scale mechanical structure. Various research institutes have loaded plastic/polymer/epoxy with carbon nanotubes (CNT), graphene flakes (GF), and graphene oxide (GO) and seen up a 200% increase in tensile strength in the loaded plastic/polymer/epoxy. The process of producing a loaded plastic/polymer/epoxy does not translate to a viable composite structure. The inability to translate the technology to a viable composite structure is combination of technical issues and cost factors. The technical limitation includes stochastic process in the curing of the plastic/polymer/epoxy that results in random shrinkage phenomena that is exacerbated in larger composite structures/devices. The distribution of the laded mechanical structural materials (CNT, GF, and GO) is non-uniform creating weak regions and failure points in the loaded plastic/polymer/epoxy material. The superior properties of graphene compared to polymers are also reflected in polymer/graphene nanocomposites. Polymer/graphene nanocomposites show superior mechanical, thermal, gas barrier, electrical and flame retardant properties compared to the neat polymer. Improvement in the physicochemical properties of the nanocomposites depends on the distribution of graphene layers in the polymer matrix as well as interfacial bonding between the graphene layers and polymer matrix. The combination low yield and high cost of the CNT, GF, and GO materials makes the approach not viable. Interfacial bonding between graphene and the host polymer dictates the final properties of the graphene reinforced polymer nanocomposite.

Graphene is an allotrope of carbon. Graphene's structure is a one-atom-thick planar sheet of sp2-bonded carbon atoms that are densely packed in a honeycomb or hexagonal crystal lattice. The carbon-carbon bond length in graphene is about 1.42 Å. Graphene sheets stack to form graphite with an inter-planar spacing of 3.35 Å. Multiple graphene sheets/flakes are bonded together by van der Waals forces.

Graphene can be oxidized by a number of processes including thermal, chemical or chemical-mechanical. Reduction of graphite oxide monolayer films e.g. by hydrazine, annealing in argon/hydrogen was reported to yield graphene films of low quality.

Graphene can be produced in significant quantities from microcrystalline graphite that is treated with a mixture of acids such as sulfuric, nitric, and other oxidizing chemical in combination mechanical and/or thermal energy elements. This processing will produce graphene flakes ranging from a few nanometers to tens of microns depending and the specific processing environment. If one uses a shaker mill in conjunction with an oxidizing agent the time duration in the mill will determine the size of the flake of graphene. In general, the longer the processing time in the mill the smaller the graphene flake. The oxidizing process produces a carboxyl group on the perimeter of the graphene flake. The resulting graphene flakes can be on the order of 5 Å in thick and can be suspended in a number of solutions including but not limited to: tetrahydrofuran, tetrachloromethane, water, and/or dichloroethane.

SUMMARY OF INVENTION

The present invention includes graphene in the form of flat graphene flakes that have oxidized edges. Suspended oxidized-edge graphene can be electroplated on a metalized substrate substrates or foils. A wide number or metals, semiconducting, or metalized substrates can be used effectively as long as they do not form an insulating layer that limits the electric field from penetration into the solution. The materials that can work in this process include ITO (Indium Tin Oxide) a full conductive oxide, Tin Oxide a semiconducting oxide, Indium Oxide a semiconducting oxide, $RuO_2$ a conductive oxide steel, stainless steel, Copper, and Nickel. Copper and Nickel have also been show to be excellent seed layers in efforts to grow epitaxial films of graphene by metal organic chemical vapor deposition (MOCVD) and other thin film deposition/growth processes that range from nickel, stainless steel and/or copper as either bulk or foils.

One embodiment of the present invention includes a method of making a high-strength composite, comprising: plating a nickel surface on a substrate; electroplating flat graphene flakes onto the conducting surface from a water suspension of graphene flakes in a vessel to give a plated layer, wherein the flakes 1 to 20 micron across, whereby electroplated graphene flakes are covalently bonded together; removing the plated substrate from the vessel; drying to remove carrier fluid from the plated graphene; applying a layer of polymer containing a solvent to infiltrate between the graphene flakes, wherein the polymer is chemically bondable to the graphene, and the solvent-containing polymer has a viscosity between 1 and 30,000 centipoises, whereby polymer is chemically bondable to two adjacent graphene flakes to provide chemical bonds between flakes; and removing solvent from the polymer and air from between the graphene flakes infiltrated by said bondable polymer layer. In one aspect, the step of removing solvent from the polymer and air from between the graphene flakes from said bondable polymer layer is vacuum facilitated.

Another embodiment of the present invention includes a method of making a high-strength composite, comprising: plating conducting surface on a substrate; electroplating flat graphene flakes onto the conducting surface from a carrier fluid suspension of graphene flakes in a vessel to give a plated layer, wherein the flakes 0.5 to 100 micron across; removing the plated substrate from the vessel; drying to remove carrier fluid from the plated graphene; applying a layer of polymer containing a solvent to infiltrate between the graphene flakes, wherein the polymer is chemically bondable to the graphene, and the solvent containing polymer has a viscosity between 1 and 30,000 centipoises; and removing air from between the graphene flakes infiltrated by said bondable polymer layer.

Yet another embodiment of the invention includes a method of making a high-strength composite, can comprise: Plating conducting surface on a substrate; Electroplating flat graphene flakes onto the conducting surface from a water suspension of graphene flakes in a vessel to give a plated layer, wherein the flakes 1 to 100 micron across; Removing the plated substrate from the vessel; Drying to remove water from the plated graphene; Applying a layer of polymer containing a solvent to the dried graphene, wherein the polymer is chemically bondable to the graphene, and the solvent containing polymer has a viscosity between 1 and 30,000 centipoises; and Vacuum drying said bondable polymer.

Electroplating flat graphene flakes out of pure water creates an unusually strong bond between the graphene and the nickel and on initial layers of graphene to graphene. On further layers of graphene, capillary action of the drying (e.g.) water, by adhesion and surface tension exerts forces pulling which are not covalently bounded surfaces of graphene together. A polymer which is chemically bondable to two adjacent graphene flakes can provide chemical bonds between flakes. Vacuum drying of the bondable polymer can generally avoid bubbles and may be assisted by capillary action. Because of the extraordinary strength of graphene, a relatively thin layer of graphene can be flexible and quite strong. Chemical modifications may be made; e.g., silver nitrate, electroless nickel plating or other metallization process and electric field, of the surface to increase graphene-fiber interaction strengths. Graphene can be dispersed as a suspension in water, e.g. using paper making techniques; the monolayer flakes can bond very powerfully when electroplated.

The surface can be on at least one of fiber, flat surface, shaped surface, or formed surface. The substrate can also be at least one of plastic, wood, metal, grass cellulose, or rayon, etc. The substrate can be shaped before the plating of the conducting surface. The substrate can also be shaped after electroplating, but before applying a layer of polymer. The drying to remove carrier fluid can be done in a vacuum-furnace chamber. The drying of bondable polymer can be done in a vacuum-furnace chamber.

The bondable polymer can be an epoxy. The bondable polymer can be thermoplastic. The bondable polymer can be thermosetting. The bondable polymer can be a mixture of thermoplastic and thermosetting plastics. The bondable polymer can be hydrophilic solvent.

The flakes can be 5 to 50 micron across, or 1 to 20 micron across, or 5 to 14 micron across. The degree of oxidation of the flakes should cover the edges, but any oxidation of the flakes' flat surfaces should be limited. Some limited stacking of flakes bonded by van der Waals, but bonded by polymer, is acceptable. Our experiments showed the electroplating deposition of a ~1 μm thick layer of graphene flakes were covalently bonded to each other and chemically bonded to the nickel foil.

The removing air from between the graphene flakes from said bondable polymer layer can be vacuum facilitated. The surface of the bondable polymer layer can be metalized and another electroplating deposition of a ~1 μm thick layer of graphene flakes covalently bonded to each other and chemically bonded to the nickel foil can be added (then be covered by another bondable polymer layer), and these steps can be repeated as needed for additional strength.

In one embodiment, the conducting surface is composed of nickel or copper. The grass can be bamboo or other similar plant derivatives. The carrier fluid can be water. Covalent and/or chemical bonding graphene can be done on rayon fiber as substrate. Exposing the fiber to vacuum to induce bonding/adhesion (e.g. by cold-welding, epoxy chemical bonding or other bonding may be used) of the deposited graphene on fiber.

Heat, vacuum and forming gas, hydrogen gas or hydrogen plasma or remote plasma may be used to enhance bonding. Hydrogen and Nitrogen are non-toxic and are mixed by a laboratory in the following ratio: 95% Nitrogen and 5% hydrogen. In this concentration the hydrogen is inert (that means it is impossible to ignite). Exposing a coated fiber or surface to heat, can speed up the drying process and may improve bonding/adhesion.

Yet another embodiment of the present invention includes a high-strength composite made by the method of: plating a conducting surface on a substrate; electroplating flat graphene flakes onto the conducting surface from a carrier fluid suspension of graphene flakes in a vessel to give a plated layer, wherein the flakes 0.5 to 100 micron across; removing the plated substrate from the vessel; drying to remove carrier fluid from the plated graphene; applying a layer of polymer containing a solvent to infiltrate between the graphene flakes, wherein the polymer is chemically bondable to the graphene, and the solvent containing polymer has a viscosity between 1 and 30,000 centipoises; and removing air from between the graphene flakes infiltrated by said bondable polymer layer.

DESCRIPTION OF INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "graphene" refers to a polycyclic aromatic molecule with carbon atoms covalently bonded to each other. The covalently bonded carbon atoms can form a six-member ring as a repeating unit, and may also include at least one of a five-member ring and a seven-member ring. Multiple graphene layers are referred to in the art as graphite. Thus, graphene may be a single layer, or also may comprise a multiple layers of graphene that are stacked on other layers of graphene. Generally, graphene will have a maximum thickness of about 100 nanometers (nm), specifically about 10 nm to about 90 nm, more specifically about 20 nm to about 80 nm.

As used herein, the term "graphene flake" refers to a crystalline or "flake" form of graphene that includes many graphene sheets stacked together.

Theoretical calculations predict with sufficient electric potential one can achieve chemical bonding between the graphene flakes and between the graphene flakes to the metalized substrate. This has been shown experimentally by electroplating graphene oxide on a nickel foil where the deposited graphene flakes survive a scotch tape adhesion test without the loss of any material. The scotch tape test is an accurate standard test to determine if the bonds exceed of the material exceed van der Waals forces. If no material is removed after pressing the scotch tape on the surface of the deposited graphene, then the bonds exceed van der Waals forces and are chemical bonds. Additional theoretical calculations predict that if the spacing between flakes can be reduced to less than 3 Å the graphene flakes could form covalent bonds between the layers. Researchers have speculated that applying a vacuum and drawing the flakes close enough together might achieve this reaction. To date no one has demonstrated the ability to draw a vacuum hard enough to allow adjacent graphene flakes to become covalently bonded. As a consequence, achieving a graphene material that has a chemical bond instead of the weak van der Waals forces is critical for the development of a macro-scale high strength structural composite.

Our results showed that electroplating deposition of a ~1 µm thick layer of graphene flakes were covalently bonded to each other and chemically bonded to the nickel foil. A standard ASTM tensile strength test has shown an uncoated nickel foil had a tensile strength of 323 MPa and the graphene coated nickel foil had a tensile strength of 375 MPa. This result was repeated several times with a standard deviation of 2.0. This is a 15% increase in the tensile strength with a 0.5 µm coating on a 60 µm nickel foil.

As additional layers of graphene oxide can be deposited, by the electroplating process, but the electric field is reduced as some of the applied voltage drops across the graphene that has been deposited. On thicker depositions of electroplated graphene some of the graphene flakes are held in place only by van der Waals forces. This was demonstrated by the removal of the ticker layers of graphene through a scotch tape test leaving the ~0.5 µm layer that was chemically bonded to the metalized substrate. Thicker layers require an additional chemical bonding to form a mechanically sound structure/composite. This require the use of a polymer such as an epoxy that forms a chemical bond with graphene/graphene oxide and has viscosity between 1 and 30,000 centipoises enabling infiltration via capillary action/wicking forces. The capillary action/wicking forces can be augmented by applying a slight vacuum to accelerate the infiltration as the vacuum removes the air and solvent between the flakes driving the epoxy/polymer between the graphene flakes. EL-335 made by Adtech, Inc. is a high temperature, toughened, impact resistant laminating system for the fabrication of high-performance marine composites. The EL-335 epoxy is used with Graphite, S-Glass, E-Glass or Kevlar fabrics. The EL-335 epoxy has superior mechanical properties and a density of ~1.5 g/cm$^3$, performance at elevated temperatures and UV stability. The epoxy enables the use of graphene coatings much thicker than 0.5 to 1 µm that is chemically bonded to the metal. Using this approach to reinforce a metal can be used to make a thinner/lighter metal with >7% enhanced strength. But to take advantage of the full potential of the technology one should use of a metalized sheet or fiber as the backbone for the composite. Steel has a density of 7.8 g/cm$^3$, polystyrene has a density of 1.09 g/cm$^3$, and graphene has a density ~1.8 g/cm$^3$. Using a 1 µm coating of nickel on plastic instead of a solid metal combined with a chemically bonded layer of graphene dramatically reduces the effective density of the composite. A viable composite can be created with graphene when it is formed into, e.g. either a fiber, a yarn, or a sheet design.

Graphene can be deposited on to a metalized fiber, sheet, or other structure to form layers of a high strength composite, which often requires using a light weight media such as a plastic that is compatible with electroless plating. Electroless nickel plating (EN) is an auto-catalytic chemical technique used to deposit a layer of nickel-phosphorus or nickel-boron alloy on a solid workpiece, such as metal or plastic. The process relies on the presence of a reducing agent, for example hydrated sodium hypophosphite ($NaPO_2H_2.H_2O$), which reacts with the metal ions to deposit metal. The alloys with different percentage of phosphorus, ranging from 2-5 (low phosphorus) to up to 11-14 (high phosphorus) are possible. The metallurgical properties of alloys depend on the percentage of phosphorus. Not all plastics can be plated with electroless plating methods. Plastics that are compatible with electroless plating include Polystryene, ABS, and other plastic media native or loaded with graphene. A thin layer (<10 µm) of copper and then nickel are deposited sequentially on the plastic. The metalized plastic is then placed into an electroplating bath where graphene oxide is deposited. The graphene is deposited to a depth grater than ~0.5 µm and less than 100 µm. The metalized plastic/graphene structure is then dried to remove any liquid from the previous deposition.

The metalized plastic/graphene structure is sprayed or coated with an epoxy. The spacing between the flakes producing wicking forces and capillary action that draws the epoxy in between the graphene flakes. To accelerate wicking forces and capillary action drawing the epoxy between the graphene flakes the metalized plastic/graphene structure can be the placed into a large chamber where a vacuum is applied. The metalized plastic/graphene/epoxy structure is then placed into a press that can apply between 15 and 150 tons of pressure, where it is sprayed with an additional coat of epoxy and layered. Once the desired number of layers has been achieved the press is activated to apply substantial pressure and heat to form the composite.

An ABS plastic fiber with a diameter is less than 100 µm and the thickness of the sheet of plastic is less than 200 µm. ABS plastic has a density ~1 g/cm$^3$. The metal thin film is deposited by use of electroplating, electroless plating, sputtering, chemical vapor deposition (CVD) or other direct deposition technique. Graphene can be deposited by electroplating process. The epoxy can be deposited by use of emersion, dipping, spraying, spin coating or other coating technique. The surface tension of the epoxy forces the loosely bound graphene particles/flakes to become parallel to the surface of the fiber or sheet additionally the capillary forces the epoxy between the graphene flakes/particles. The infiltration of the epoxy can be facilitated and accelerated by applying a modest vacuum. The vacuum draws any remaining air and solvent from between the graphene flakes/particles replacing the air and solvent with the epoxy. The epoxy can be cured by time, temperature and/or vacuum. The fiber, sheet, or other structure can be placed into a chamber where it can be exposed to a vacuum and/or temperature. Once a sheet or fabric structure has been formed the structure may be shaped into the composite final form. The temperature cannot exceed the thermal limit of the plastic fiber, sheet, or other structure. The vacuum and/or heat the epoxy cures and chemically bonds the graphene flakes/particles together. The graphene coated fiber or sheet can then be combined into a yarn. The yarn can also be treated in a vacuum furnace performing chemical bonding between the threads of the yarn. The yarn can then be woven into a fabric, rope or cable. The rope or cable can be then be drawn through the epoxy bath to promote chemical bonding between the strands of the rope or cable. The rope or cable structure can be placed into a chamber where it can be exposed to a vacuum and/or temperature to facilitate curing. The fiber, rope or cable can also be cured/set at room temperature and pressure. The fiber, rope or cable can also be considered a final product. The fabric formed from the yarn can be shaped/cut at this point to take the final form of the composite. The shaped or unshaped fabric, created from the yarn can be treated with epoxy layered with other layer fabrics placed into a heated press to produce chemical bonding between the layers of the composite. Because the layer of nickel is a greater percentage of the fiber/rope/yarn/cable structure the density will be less than 1.9 g/cm$^3$ and have tensile and shear strength greater than either Aluminum or Steel.

The sheet of ABS/Ni:Cu/Graphene/Epoxy can be treated with epoxy layered with other layer fabrics placed into a heated press to produce chemical bonding between to form a two dimensional or shaped composite structure, ABS plastic is a thermal plastic that can be placed into a heated press that takes the ABS plastic to its thermal set temperature, and cools it in that form producing the final shape. The nickel and graphene are a lower percentage of the final composite relative to the fiber structure and as such the density will be less than 1.5 g/cm$^3$ for a sheet structure have tensile and steer strength greater than either Aluminum or Steel.

EXAMPLES

An ABS (Acrylonitrile butadiene styrene, $(C_8H_8 \cdot C_4H_6 \cdot C_3H_3N)_n$ melting point of 105° C.) plastic fiber with a diameter a 10 μm can be metalized with a 1 μm thin film cooper/nickel by electroless plating. The graphene oxide can be then suspended in an aqueous solution and a 2-μm graphene layer can be deposited by electroplating process on the metalized ABS plastic fiber. The metalized graphene coated ABS fiber can be then dried in air. The dried metalized/graphene coated ABS fiber can be then drawn through a bath of EL-335 epoxy and then pulled into a vacuum chamber for curing. The cured fiber can be then used to form a yarn using standard textile manufacturing processes. The yarn created from the ABS/Ni:Cu/Graphene/Epoxy can be form into a rope or a fabric. The fiber, yarn, rope, or cables are composite structures. A fabric made from the yarn can be placed into a heated mechanical press that can apply between 15 and 150 tons of pressure where it can be layered with other fabrics with each layer coated with EL-335 epoxy. The layers of the material may be composed of the same fabric or of a different material. The press applies the pressure and heat to form a two dimensional composite structure. ABS plastic is a thermal plastic that can be trimmed to form the shape to the desired part/product, and then placed into heated press that takes the ABS plastic to its thermal set temperature, and cools it in that form producing the final shape. The nickel and graphene are a higher percentage of the final composite relative to the sheet structure and as such the density will be less than 1.9 g/cm$^3$ for a sheet structure and have tensile and shear strength greater than either Aluminum or Steel; thus providing a graphene material that is both much lighter and stronger.

An ABS (Acrylonitrile butadiene styrene, $(C_8H_8 \cdot C_4H_6 \cdot C_3H_3N)_n$ melting point of 105° C.) plastic sheet with a thickness a 50 μm can be trimmed, cut or stamped to form the shape of the final composite structure. The shaped ABS plastic sheet can be metalized with a 1 μm thin film cooper/nickel by electroless plating. Graphene oxide can be then suspended in an aqueous solution and a 10 μm graphene layers can be deposited by electroplating process on the metalized ABS plastic sheet. The metalized graphene coated ABS sheet can be then dried in air or in a slight vacuum. The dried metalized/graphene coated ABS sheet can be then coated with a thin layer of EL-335 epoxy by a spraying process akin to spray painting. The ABS/Ni:Cu/Graphene/Epoxy sheet can be placed into a vacuum chamber for curing. The sheets may also be cured at room temperature and pressure. The sheets can be placed into a heated mechanical press (reference) where it can be layered with other sheets with each sheet coated with EL-335 epoxy. The sheets of the material may be composed of the same fabric or of a different material. The press applies mechanical force and heat to form a two dimensional composite structure. ABS plastic in the ABS/Ni:Cu/Graphene/Epoxy structure is a thermal plastic that can be trimmed to form the shape to the desired part/product, and then placed into heated press that takes the ABS plastic to its thermal set temperature, and cools it in that form producing the final shape. The nickel and graphene are a lower percentage of the final composite relative to the fiber structure and as such the density will be less than 1.5 g/cm$^3$ and have tensile and shear strength greater than either Aluminum or Steel.

Another approach of using graphene flake reinforcement is using a method of aligning graphene flakes in a structure comprising: suspending graphene flakes in a fluid; extruding the graphene flake-containing fluid in a direction, wherein the graphene flake-containing fluid is subjected to a magnetic field having lines of flux substantially parallel to the direction of extrusion; and solidifying the fluid.

The graphene flake-containing fluid can be subjected to a magnetic field having lines of flux substantially parallel to the direction of extrusion prior to extrusion, during extrusion, after extrusion, or combinations thereof. Magnetic field can be created by electromagnetically, with one or more permanent magnets, or both. Diamagnetic material is preferably used to parallelize lines of flux. It can be used prior to extrusion, during extrusion, after extrusion, or combinations thereof. The extrusion tip can be boron carbide, and the extrusion tip can be elongated. The fluid can be plastic, glass, ceramic, or metal. The metal can be aluminum.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context. In certain embodiments, the present invention may also include methods and compositions in which the transition phrase "consisting essentially of" or "consisting of" may also be used.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. A method of making a high-strength composite, comprising:
    plating a conducting surface on a substrate;
    electroplating flat graphene flakes onto the conducting surface from a carrier fluid suspension of the graphene flakes in a vessel to give a plated layer, wherein the flakes have an average width of 0.5 to 100 microns;
    removing the plated substrate from the vessel;
    drying to remove the carrier fluid from the plated graphene;
    applying a layer of polymer containing a solvent to infiltrate between the graphene flakes, wherein the polymer comprises an epoxy and forms a chemical bond to the graphene, and the solvent containing polymer has a viscosity between 1 and 30,000 centipoises;
    removing air from between the graphene flakes infiltrated by the layer of polymer; and
    removing the solvent from the polymer and leaving the polymer chemically bonded to the graphene.

2. The method of claim 1, wherein the substrate is a fiber or has a flat surface, a shaped surface, or a formed surface.

3. The method of claim 1, wherein the substrate is at least one of a plastic, a wood, a metal, or a grass.

4. The method of claim 1, wherein the substrate is formed before the plating of the conducting surface.

5. The method of claim 1, wherein the drying to remove the carrier fluid is done in a vacuum-furnace chamber.

6. The method of claim 1, wherein the removing of the solvent from the polymer is done in a vacuum-furnace chamber.

7. The method of claim 1, wherein the polymer further comprises is at least one of a thermoplastic or a thermosetting polymer.

8. The method of claim 1, wherein the polymer further comprises a mixture of thermoplastic and thermosetting plastics.

9. The method of claim 1, wherein the graphene flakes are 5 to 50 micron across.

10. The method of claim 1, wherein the graphene flakes are 5 to 20 micron across.

11. The method of claim 1, wherein the graphene flakes are 5 to 14 micron across.

12. The method of claim 1, wherein the removing air from between the graphene flakes from the layer of polymer is vacuum facilitated.

13. The method of claim 1, wherein the conducting surface is nickel or copper.

14. The method of claim 3, wherein the grass is bamboo.

15. The method of claim 1, wherein the carrier fluid is water.

16. A method of making a high-strength composite, comprising:
    plating a conducting surface on a substrate;
    electroplating flat graphene flakes onto the conducting surface from a suspension of the graphene flakes in a carrier fluid in a vessel to give a plated layer, wherein the flakes are 5 to 20 micron across;
    removing the plated substrate from the vessel;

drying to remove the carrier fluid from the plated graphene;

applying a layer of polymer containing a solvent to infiltrate between the graphene flakes, wherein the polymer comprises an epoxy and forms a chemical bond to the graphene, and the solvent-containing polymer has a viscosity between 1 and 30,000 centipoises;

and removing solvent from the polymer and air from between the graphene flakes infiltrated by the layer of polymer and leaving the polymer chemically bonded to the graphene.

17. The method of claim 16, wherein the removing solvent from the polymer and air from between the graphene flakes from said polymer layer is vacuum facilitated.

* * * * *